United States Patent
Cancio et al.

(10) Patent No.: US 12,065,580 B2
(45) Date of Patent: Aug. 20, 2024

(54) VOID REDUCING ASPHALT MEMBRANE EMULSION

(71) Applicant: Russell Standard Corp., Pittsburgh, PA (US)

(72) Inventors: Brian Cancio, Grove City, PA (US); Ashley Seybert, McDonald, OH (US); Lucas Greenawalt, New Castle, PA (US)

(73) Assignee: Russell Standard Corp., Pittsburgh, PA (US)

( * ) Notice: Subject to any disclaimer, the term of this patent is extended or adjusted under 35 U.S.C. 154(b) by 25 days.

(21) Appl. No.: 17/548,767

(22) Filed: Dec. 13, 2021

(65) Prior Publication Data

US 2022/0186076 A1    Jun. 16, 2022

Related U.S. Application Data

(60) Provisional application No. 63/125,437, filed on Dec. 15, 2020.

(51) Int. Cl.
| | | |
|---|---|---|
| *C08L 95/00* | (2006.01) | |
| *C09D 195/00* | (2006.01) | |
| *E01C 23/02* | (2006.01) | |

(52) U.S. Cl.
CPC ........ *C09D 195/005* (2013.01); *C08L 95/005* (2013.01); *C08L 2555/50* (2013.01); *C08L 2555/54* (2013.01); *C08L 2555/82* (2013.01); *C08L 2555/84* (2013.01); *E01C 23/02* (2013.01)

(58) Field of Classification Search
CPC .................................................. C08L 95/005
See application file for complete search history.

(56) References Cited

U.S. PATENT DOCUMENTS

| | | | | |
|---|---|---|---|---|
| 5,503,871 A | * | 4/1996 | Blacklidge | E01C 7/358 |
| | | | | 106/277 |
| 5,981,632 A | * | 11/1999 | Fields | C08K 3/346 |
| | | | | 524/68 |
| 2008/0060551 A1 | * | 3/2008 | Crews | C08L 95/005 |
| | | | | 106/277 |
| 2021/0198491 A1 | | 7/2021 | Praw et al. | |

FOREIGN PATENT DOCUMENTS

| | | | | | |
|---|---|---|---|---|---|
| GB | | 2255291 A | * | 11/1992 | ................ C08J 3/03 |
| WO | | WO-9105829 A | * | 5/1991 | ............ C08L 95/005 |

OTHER PUBLICATIONS

WO 91/05829 Machine Translation (Year: 2023).*

* cited by examiner

*Primary Examiner* — Alexandra M Moore
(74) *Attorney, Agent, or Firm* — The Webb Law Firm

(57) ABSTRACT

Provided herein is an asphalt membrane emulsion for reducing voids in an asphalt joint that includes asphalt, an asphalt modifier, mineral filler, an emulsifier, and water. Provided herein is a method of making an asphalt membrane emulsion, the method including: forming a first phase; forming a second phase; pumping the first phase and the second phase into a colloid mill; and mixing the first phase and second phase into the colloid mill to form the asphalt membrane emulsion. The first phase includes asphalt, asphalt modifier, and mineral filler. The second phase includes water and an emulsifier. A method of applying an asphalt membrane emulsion to fill a crack is also provided.

18 Claims, No Drawings

VOID REDUCING ASPHALT MEMBRANE EMULSION

CROSS-REFERENCE TO RELATED APPLICATION

This application claims priority to U.S. Provisional Application No. 63/125,437, filed on Dec. 15, 2020, the disclosure of which is incorporated by reference in its entirety.

BACKGROUND OF THE INVENTION

Field of the Invention

The present disclosure relates generally to materials for use in paving and road construction. In some non-limiting examples, the present disclosure relates to an asphalt membrane emulsion, which can be used as a crack sealant for longitudinal joints, for trackless tack, tack coat, pavement sealer, fog sealer, and a metal and concrete sealer.

Description of Related Art

In the construction of new roads, it is often necessary to prepare a base layer, followed by subsequent provision of successive layers of whatever material is selected for the road, which shall be referred to as paving material. During the repair of roads, layers of cracked, damaged, or otherwise inadequate paving material are removed through grinding or stripping, leaving an exposed underlying layer. Subsequent layers of paving material are then provided to the underlying base layer of a repaired road.

Paving the width of the road in a single pass is difficult due to the inability to close an entire road for an extended period of time. Therefore, roads are paved in multiple passes, with each pass typically being the width of one lane. In the first pass, a layer of hot paving material is applied on the roadway and compacted. The compaction process increases the density of the paved material by reducing air voids trapped within the paving material. However, the unconfined edge of the paved lane cannot be sufficiently compacted, as compared to the center of the first pass, resulting in an edge having a lower density (due to the presence of air voids). In the second pass, a layer of hot paving material is laid adjacent to the previously paved portion of the roadway, which is at a lower temperature, forming a longitudinal joint. The differences in temperature of the previously paved portions as well as insufficient compaction can result in improper adhesion and in a longitudinal joint having a lower density than the rest of the paved portions.

The higher amount of air voids at the longitudinal joint creates permeability throughout the joint allowing for the intrusion of air and water, which can lead to crack formation and ultimately, the failure of the joint. Such results can be dangerous for vehicles passing over, such as, road. Moreover, such road failures require repairs, resulting in a need to spend additional time and money, a need to detour traffic, and decreased productivity and quality of life for residents of the area of concern.

Sealant emulsions for longitudinal joints are known in the art, and have differing characteristics in terms of composition and ultimate physical properties.

SUMMARY OF THE INVENTION

The invention is related to an asphalt membrane emulsion for reducing voids in an asphalt joint. The asphalt membrane emulsion comprises asphalt, an asphalt modifier, mineral filler, an emulsifier, and water.

The invention is related to a method of making an asphalt membrane emulsion. The method comprises: forming a first phase; forming a second phase; pumping the first phase and the second phase into a colloid mill; and mixing the first phase and second phase in the colloid mill to form the asphalt membrane emulsion. The first phase comprises: asphalt; asphalt modifier; and mineral filler. The second phase comprises: water; and an emulsifier.

The invention is related to a method of applying an asphalt membrane emulsion to fill a crack. The method comprises: applying the asphalt membrane emulsion into a crack, where the asphalt membrane emulsion comprises asphalt, an asphalt modifier, mineral filler, an emulsifier, and water. The asphalt membrane emulsion is cured within the crack to form a cured asphalt membrane emulsion within the crack.

The invention is related to an asphalt surface comprising a crack and a cured asphalt membrane emulsion within said crack. The cured asphalt membrane emulsion within the crack comprises asphalt, an asphalt modifier, mineral filler, and an emulsifier.

DESCRIPTION OF THE INVENTION

The following description is merely exemplary in nature and is in no way intended to limit the invention, its application, or uses. While the description is designed to permit one of ordinary skill in the art to make and use the invention, and specific examples are provided to that end, they should in no way be considered limiting. It will be apparent to one of ordinary skill in the art that various modifications to the following will fall within the scope of the appended claims. The present invention should not be considered limited to the presently disclosed embodiments, whether provided in the examples or elsewhere herein.

The use of numerical values in the various ranges specified in this application, unless expressly indicated otherwise, are stated as approximations as though the minimum and maximum values within the stated ranges are both preceded by the word "about". In this manner, slight variations above and below the stated ranges can be used to achieve substantially the same results as values within the ranges. Also, unless indicated otherwise, the disclosure of these ranges is intended as a continuous range including every value between the minimum and maximum values. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. For definitions provided herein, those definitions refer to word forms, cognates and grammatical variants of those words or phrases.

The terms "a" and "an" are intended to refer to one or more.

The present invention relates to an asphalt membrane emulsion for reducing voids in an asphalt joint including asphalt, an asphalt modifier, mineral filler, an emulsifier, and water.

The term "asphalt membrane emulsion" refers to an emulsion including asphalt, an asphalt modifier, mineral filler, an emulsifier, and water.

As used herein, the term "asphalt" refers to any asphaltic-based paving material that can be utilized to construct and repair roads. Such materials include asphalt, asphalt binders, asphalt cements, asphalt-based cements, asphalt concrete, cut-back asphalts, emulsified asphalts, modified asphalts, bituminous material, bitumen, and the like. One of ordinary skill in the art will understand that the asphalt membrane emulsion disclosed may be used as an adhesive to bond together layers of any asphaltic material.

Asphalt has various properties, including penetration grading, viscosity grading, and performance grading. Penetration grading refers to depth into a section of asphaltic material that a needle with 100 grams of weight thereon will penetrate when applied to the material for 5 seconds at an ambient temperature of 25 degrees Celsius (77 degrees Fahrenheit). The penetration grading is measured in tenths of a millimeter (dmm). Thus, an asphalt having a penetration grading of 50 dmm is one in which a 100 gram weight penetrates the material to a depth of 5 mm after 5 seconds at an ambient temperature of 25 degrees Celsius. Penetration gradings may be tested according to AASHTO T-49 standard, developed by the American Society for Testing and Materials (ASTM), and promulgated by the American Association of State Highway and Transportation Officials. A non-limiting example of an asphalt is a bitumen asphalt having a penetration rating between 40 and 60.

Asphalt is performance graded based upon climate, referencing a high pavement surface temperature and low pavement service temperature. To determine the high pavement surface temperature of the asphalt, an average of a 7 day maximum pavement temperature is used. As thermal cracking can occur as a result of one cold night, the low pavement service temperature is the minimum pavement temperature that is likely to be experienced in a low temperature climate. Non-limiting examples of suitable asphalts include an asphalt having an average 7 day maximum pavement temperature of 64° C. and a minimum pavement temperature of −22° C. (performance grade (PG) 64-22), an asphalt having an average 7 day maximum pavement temperature of 58° C. and a minimum pavement temperature of −28° C. (PG 58-28), an asphalt having an average 7 day maximum pavement temperature of 58° C. and a minimum pavement temperature of −22° C. (PG 58-22), an asphalt having an average 7 day maximum pavement temperature of 52° C. and a minimum pavement temperature of −28° C. (PG 52-28), an asphalt having an average 7 day maximum pavement temperature of 52° C. and a minimum pavement temperature of −22° C. (PG 52-22), an asphalt having an average 7 day maximum pavement temperature of 52° C. and a minimum pavement temperature of −34° C. (PG 52-34), an asphalt having an average 7 day maximum pavement temperature of 58° C. and a minimum pavement temperature of −34° C. (PG 58-34), or combinations thereof. In one non-limiting embodiment, the asphalt is PG 52-28, PG 58-28, PG 64-22, PG 58-22, PG 64-28, or combinations thereof. In one non-limiting embodiment, the asphalt is PG 52-28, PG 58-28, or combinations thereof. Performance grading may be tested according to AASHTO M-320 standard or ASTM D6373-16 standard (or prior equivalent version). One of ordinary skill in the art will understand that asphalt having a similar viscosity grading or penetration grading as the performance graded asphalt may be used as a suitable asphalt.

As used herein, "asphalt modifier" refers to a material that interacts physically and/or chemically with asphalt to form a modified asphalt. The asphalt modifier can be a material that comprises one or more cross-linkable groups.

As used herein, "modified asphalt" refers to asphalt that has been physically and/or chemically blended with one or more additional materials.

The asphalt modifier can be a polymer material that comprises one or more cross-linkable groups. As a class, "polymers" can include, without limitation homopolymers, heteropolymers, or copolymers, block polymers, block copolymers, and can be both natural and synthetic. Homopolymers contain one type of building block, or monomer, whereas copolymers contain more than one type of monomer. An "oligomer" can be a polymer that comprises a small number of monomers, such as, for example, from 3 to 100 monomer residues.

The asphalt modifier can be a polymer that may be selected from at least one of the following non-limiting examples: styrene butadiene, styrene butadiene styrene, polystyrene, or combinations thereof. The asphalt modifier is a linear polymer that has little to no effect on the viscosity of the asphalt membrane emulsion. In one non-limiting embodiment, the asphalt modifier is not a radial polymer. In one non-limiting embodiment, the asphalt modifier is styrene butadiene styrene. In one non-limiting embodiment, the asphalt modifier is linear styrene butadiene styrene having no more than 35% by weight styrene, such as, 30% by weight styrene. Non-limiting commercial suppliers of styrene butadiene styrene asphalt modifiers include, but, are not limited to: Dynasol, Kraton, KUMHO, Kibiton, En Chaun Chemical, Dexco, and LG. Mixtures of any of the above asphalt modifiers may be used. In one non-limiting embodiment, the asphalt modifier is styrene butadiene having no more than 36% by weight styrene, such as, no more than 33% by weight styrene. A non-limiting commercial example of a suitable styrene butadiene asphalt modifier is Kraton D0243 (Kraton).

The asphalt modifier can be an isocyanate. As used herein, an "isocyanate" is a compound having one isocyanate group (—N═C═O). A non-limiting commercial example of a suitable isocyanate modifier is B2LAST (BASF). In one non-limiting embodiment, the asphalt modifier is an isocyanate and is added to the asphalt in an amount ranging from 0.2 weight percent (wt. %) to 7 wt. %, such as, from 0.3 wt. % to 6 wt. %, such as, from 0.4 wt. % to 5 wt. %, or such as, from 0.5 wt. % to 4 wt. %, based on the total weight of the asphalt.

The asphalt can be mixed with an isocyanate modifier to form an isocyanate modified asphalt. In one non-limiting embodiment, the only asphalt modifier used to form the modified asphalt is an isocyanate. In one non-limiting embodiment, the modified asphalt can be prepared by first mixing the asphalt with an isocyanate modifier to form an isocyanate modified asphalt and then the isocyanate modified asphalt can be mixed with a polymer that may be selected from at least one of the following non-limiting examples: styrene butadiene, styrene butadiene styrene, polystyrene, or combinations thereof. In one non-limiting embodiment, the modified asphalt can be prepared by first mixing the asphalt with an isocyanate modifier to form an isocyanate modified asphalt and then the isocyanate modified asphalt can be mixed with styrene butadiene styrene. In one non-limiting embodiment, the modified asphalt can be prepared by first mixing the asphalt with an isocyanate modifier to form an isocyanate modified asphalt and then the isocyanate modified asphalt can be mixed with styrene butadiene, such as, Kraton D0243.

The asphalt modifier can be a polymeric dispersion of organic rubber particles. The organic rubber particles may be selected from at least one of the following non-limiting examples: styrene butadiene rubber, polychloroprene, or combinations thereof. The polymeric dispersion of organic rubber particles is a latex in which the organic rubber particles are dispersed in water. Non-limiting commercial examples of polymeric dispersions comprising styrene butadiene rubber particles include, but are not limited to: NX4190 (BASF) and Ultrapave UP 1159 (Ultrapave). Non-limiting commercial examples of polymeric dispersions comprising polychloroprene particles include, but are not limited to: SL101 (Showa Denko K.K.), SL350 (Showa Denko K.K.), and Chloroprene 115® (Showa Denko K.K.).

In one non-limiting embodiment, the only asphalt modifier used to form the modified asphalt is the polymeric dispersion of styrene butadiene rubber, polychloroprene, or combinations thereof. In one non-limiting embodiment, a polymer that may be selected from at least one of the following non-limiting examples: styrene butadiene, styrene butadiene styrene, polystyrene, or combinations thereof is used in combination with a polymeric dispersion of styrene butadiene rubber, polychloroprene, or combinations thereof to form the modified asphalt. In one non-limiting embodiment, the modified asphalt can be prepared by first mixing the asphalt with an isocyanate modifier to form an isocyanate modified asphalt and then the isocyanate modified asphalt can be mixed with a polymeric dispersion of styrene butadiene rubber, polychloroprene, or combinations thereof. In one non-limiting embodiment, the modified asphalt can be prepared by first mixing the asphalt with an isocyanate modifier to form an isocyanate modified asphalt and then the isocyanate modified asphalt can be mixed with a polymeric dispersion of styrene butadiene rubber, such as, NX4190 (BASF). In one non-limiting embodiment, the modified asphalt can be prepared by first mixing the asphalt with an isocyanate modifier to form an isocyanate modified asphalt and then the isocyanate modified asphalt can be mixed with a polymeric dispersion of polychloroprene, such as, SL350 (Showa Denko K.K.).

As used herein, "mineral filler" refers finely divided mineral matter such as, rock dust, mineral dust, sand, slag dust, lime, fly ash, Portland cement, loess, combinations thereof, or mixtures thereof. The mineral filler has a fineness that allows it to pass through a 50 mesh sieve, such as, mineral filler having a particle size of less than 300 microns (µm), such as, less than 297 µm. A non-limiting example of a suitable mineral filler is lime. The lime can be calcium based, magnesium based, or combinations thereof. In one non-limiting embodiment, the lime is magnesium based lime. The lime may be agricultural grade lime, or it may be ASTM grade lime, or it may be a combination of agricultural lime and ASTM grade lime. Agricultural grade lime consists of calcium carbonate limestone that is crushed to a fine powder. ASTM grade lime is hydrated lime and can include normal lime (N type), normal air-entraining lime (NA type), special hydrated lime (S type), or special air-entraining lime (SA type) according to ASTM Standard C207-18 (or prior equivalent version).

The emulsifier may be selected depending on whether the asphalt membrane emulsion is to be cationic (e.g., a cationic asphalt membrane emulsion), anionic (e.g., an anionic asphalt membrane emulsion), or isoelectric (e.g., an isoelectric asphalt membrane emulsion).

The emulsifier may include a quaternary ammonium salt fatty acid based emulsifier which is suitable to make stable cationic emulsions of asphalt containing a large fraction of medium and high molecular weight (HMW, MMW) species (higher than 5 kiloDaltons (KDa) determined by gel permeation chromatography in THF). Examples of such emulsifiers include: Redicote E-11 E, Redicote E-11 HF-1, and Indulin AA-57D. In one non-limiting example, the emulsifier is Redicote E-11HF.

The emulsifier used in an anionic emulsion may include a zwitterionic emulsifier(s) which is suitable to make stable anionic emulsions of asphalt containing a large fraction of MMW species (MMW range from 45 to 5 kDa). Examples of such emulsifiers include Redicote E-7000 and Indulin W-5.

The emulsifier used in an isoelectric emulsion may include a zwitterionic emulsifier(s) which is suitable to make stable isoelectric emulsions of asphalt containing a large fraction of HMW and MMW species (higher than 5 kDa) with or without modifying the pH of the asphalt membrane emulsion. The isoelectric point (PI) of an emulsion is the pH at which the emulsion has simultaneously an anionic and cationic (neutral) charge.

Mixtures of any of the above emulsifiers may be used.

The emulsifier of the asphalt membrane emulsion may have an isoelectric point between a pH of 4.5 to 8, such as, 6 to 8. Using such an emulsifier in the asphalt membrane emulsion may make it such that no acid is required to be included in the asphalt membrane emulsion. Thus, in some non-limiting embodiments, the asphalt membrane emulsion may be free of acid.

The asphalt membrane emulsion may optionally include an acid. The acid may be included in a cationic emulsion. The acid may be included in an amount such that the pH of the asphalt membrane emulsion is from 1 to 3. Non-limiting examples of acids include hydrochloric acid, sulfuric acid, acetic acid, and combinations thereof.

The asphalt membrane emulsion may optionally include a base. The base may be included in an anionic emulsion. The base may be included in an amount such that the pH of the asphalt membrane emulsion is from 9 to 12. Non-limiting examples of suitable bases include sodium hydroxide, potassium hydroxide, and combinations thereof.

The asphalt membrane emulsion may optionally include a thickener. As used herein, "thickener" refers to a material that increases the viscosity of the fluid composition (e.g., a liquid or emulsion) to which it is added. The thickener may comprise a water-soluble cellulose backbone and ether containing substituents. The thickener may be selected from at least one of the following non-limiting examples: methyl cellulose (MC), sodium carboxymethyl cellulose (CMC), hydroxypropyl cellulose (HPC), ethyl hydroxyethyl cellulose (EHEC), hydroxyethyl cellulose (HEC), methyl hydroxypropyl cellulose (MHPC), methyl ethyl hydroxyethyl cellulose (MEHEC), or combinations thereof. In one non-limiting embodiment, the thickener is methyl hydroxypropyl cellulose. Non-limiting commercial examples of thickeners include, but, are not limited to: Klucel® [Aqualon]; Glutolin [Kalle]; CMC7HC [Hercules]; Methocel A [Dow]; Cellosize® [Union Carbide]; and Bermocoll [Nouryon]. Mixtures of any of the above thickeners may be used.

The asphalt membrane emulsion may optionally include a sulfur cross-linker. As used herein, "sulfur cross-linker" refers to a component having a sulfur atom that is suitable for cross-linking the asphalt with cross-linkable groups on the asphalt modifier component. The sulfur cross-linker can be added into the asphalt membrane emulsion as a liquid or powder component. Non-limiting commercial suppliers of the sulfur cross-linker include, but, are not limited to: Alberty Additives, Hexpol, Performance Technology Services and S&B distributors. Non-limiting examples of suitable sulfur cross-linkers are AS-2000 and AS-3000 from Alberty Additives. Mixtures of any of the above sulfur cross-linkers may be used.

The present invention relates to a method of making an asphalt membrane emulsion. The method involves forming a first phase; forming a second phase; pumping the first phase and the second phase into a colloid mill; and mixing the first phase and second phase in the colloid mill to form the asphalt membrane emulsion.

As used herein, "colloidal mill" refers to a machine used to reduce droplet size in an emulsion.

The first phase may include asphalt, asphalt modifier, and mineral filler. The first phase may optionally include a sulfur cross-linker, or may be free of a sulfur cross-linker.

The first phase may have the above-described components thereof in the following ranges in Table A.

TABLE A

| Raw Material | Most Preferred Range (wt. %) | More Preferred Range (wt. %) | Preferred Range (wt. %) | Range (wt. %) |
|---|---|---|---|---|
| Asphalt | 85-91 | 82-92 | 68-94 | 50-96 |
| Asphalt Modifier | 6-10 | 4-12 | 2-14 | 1-15 |
| Mineral Filler | 3-7 | 2-8 | 1-10 | 0.5-12 |
| Sulfur Cross-Linker (Optional) | 0.05-0.6 | 0.03-0.7 | 0.02-1.5 | 0.01-3 |

To form the first phase, the asphalt is heated to a temperature of at least about 300 degrees Fahrenheit (149 degrees Celsius), such as, from 300 to 350 degrees Fahrenheit (149 to 177 degrees Celsius). The asphalt modifier is added to the asphalt using in-line mixing, tank mixing, in-line milling, or combinations thereof to form a modified asphalt. The optional sulfur cross-linker is added to the modified asphalt using in-line mixing, tank mixing, in-line milling, or combinations thereof. The mineral filler is added to the modified asphalt or the sulfur modified asphalt using in-line mixing, tank mixing, in-line milling, or combinations thereof. In one non-limiting embodiment, the sulfur cross-linker is added to the first phase prior to the addition of the mineral filler.

The second phase may comprise water and an emulsifier. The second phase may optionally include an acid and/or a base, or the second phase may be free of an acid and/or base. The second phase may optionally include a thickener, or the second phase may be free of a thickener.

The emulsifier may be selected depending on whether the second phase is to be cationic (e.g., a cationic second phase), anionic (e.g., an anionic second phase), or isoelectric (e.g., an isoelectric second phase).

The emulsifier of the second phase may have an isoelectric point between a pH of 4.5 to 8, such as, 6 to 8. Using such an emulsifier in the second phase may make it such that no acid or base is required to be included in the second phase. Thus, in some non-limiting embodiments, the second phase may be free of an acid or a base. The resulting emulsion (the combination of the first phase and the second phase) would exhibit properties of both an anionic emulsion and a cationic emulsion.

In one non-limiting embodiment, the asphalt membrane emulsion is a cationic asphalt membrane emulsion, where the cationic membrane emulsion comprises a cationic emulsifier.

The second phase may include an acid. The acid may be used with a cationic emulsifier. The acid may be included in an amount such that the pH of the second phase is from 1 to 3.

In one non-limiting embodiment, the asphalt membrane emulsion is an anionic asphalt membrane emulsion, where the anionic membrane emulsion comprises an anionic emulsifier.

The second phase may include a base. The base may be used with an anionic emulsifier. The base may be included in an amount such that the pH of the second phase is from 9 to 12.

A mixture of acid(s) and/or base(s) may be included in the second phase.

The second phase may have the above-described components thereof in the following ranges in Table B.

TABLE B

| Raw Material | Most Preferred Range (wt. %) | More Preferred Range (wt. %) | Preferred Range (wt. %) | Range (wt. %) |
|---|---|---|---|---|
| Water | 92-97 | 90-98 | 85-98 | 80-99 |
| Emulsifier | 3.5-7 | 2-8 | 1-10 | 0.5-12 |
| Thickener (Optional) | 0.2-1 | 0.1-1.5 | 0.1-3 | 0.05-5 |
| Acid or Base (Optional) | 0.2-0.5 | 0.1-1 | 0.1-2 | 0.5-3 |

To form the second phase, the water is obtained from a municipal source, having a pH from 6 to 8, at ambient temperature. The water is heated to a temperature of up to 120 degrees Fahrenheit (49 degrees Celsius) and the emulsifier is added into the water. When the second phase comprises thickener, the thickener is added to the heated water prior to the addition of the emulsifier and is mixed until the thickener has fully dissolved in the water. Optional acid is added to the water mixture, after the addition of the emulsifier, to obtain a pH of 1 to 3 or optional base is added to the water mixture, after the addition of the emulsifier, to obtain a pH of 9 to 12.

The asphalt membrane emulsion may be formed by pumping the first phase and the second phase into a colloid mill and mixing the first phase and second phase in the colloid mill to form the asphalt membrane emulsion. The asphalt emulsion may be formed from a mixture of the above-described first phase and second phase and may have the above-described phases thereof in the following ranges in Table C.

TABLE C

| Raw Material | Most Preferred Range (wt. %) | More Preferred Range (wt. %) | Preferred Range (wt. %) | Range (wt. %) |
|---|---|---|---|---|
| First Phase | 55-70 | 50-75 | 45-80 | 40-85 |
| Second Phase | 30-45 | 25-50 | 20-55 | 15-60 |

The first phase is heated to a temperature of at least 360 degrees Fahrenheit (182 degrees Celsius), such as, between 360 and 380 degrees Fahrenheit (between 182 and 193 degrees Celsius) and pumped into the colloidal mill. The second phase is heated to a temperature of at least 100 degrees Fahrenheit (38 degrees Celsius), such as, between 100 and 120 degrees Fahrenheit (38 to 49 degrees Celsius), and pumped into the colloidal mill. When mixing the first phase and second phase in the colloid mill to form the asphalt membrane emulsion, the asphalt membrane emulsion does not exceed a temperature of greater than 212 degrees Fahrenheit (100 degrees Celsius). The mixed first phase and second phase exits the colloidal mill at a temperature of about 205 degrees Fahrenheit (96 degrees Celsius).

In any of the above-described asphalt membrane emulsions, the first phase and the second phase may be stored in separate tanks prior to mixing to form the asphalt membrane emulsion.

The asphalt membrane emulsion formed from the above identified materials in the above-identified manner may be used to fill a crack. For example, the asphalt membrane emulsion is formed from the above-identified materials in the above-identified manner and comprises a mixture of a first phase and a second phase. The asphalt membrane emulsion is applied into a crack. The asphalt membrane emulsion is cured within the crack to form a cured asphalt membrane emulsion within the crack.

The asphalt membrane emulsion may be applied into a crack by a standard spray distributor for spraying asphalt emulsion, tack buggy, hand sprayer, or combinations thereof. The asphalt membrane emulsion may be applied into the crack using a mechanical pumping device comprising a hose and spray nozzle attached at the end of the hose. The asphalt membrane emulsion may be applied at any suitable rate or amount. The asphalt membrane emulsion may be applied at between 0.2 and 3 gallons of emulsion per square yard ($gpy^2$), depending on the material the asphalt membrane emulsion is applied to and the method of application.

When the asphalt membrane is applied into a crack, the asphalt membrane emulsion may be heated to a temperature suitable for even application of the composition. In non-limiting embodiments, the asphalt membrane emulsion may be from 130 to 200 degrees Fahrenheit when it is applied, such as, from 150 to 180 degrees Fahrenheit. Once the asphalt membrane emulsion is applied into a crack, the asphalt membrane emulsion may be permitted to cure. Drying or curing may occur for 60 minutes or less, such as, 45 minutes or less, such as, 30 minutes or less, such as, 15 minutes or less, or such as, 2 minutes or less, depending on the environmental conditions (e.g., temperature, direct light/sun, humidity, and air flow), application rate, application temperature, and combinations thereof. The makeup of the asphalt membrane emulsion may affect drying or curing time. A hot and dry environment (low humidity) accelerates curing the asphalt membrane emulsion.

The present invention relates to an asphalt surface comprising a crack and a cured asphalt membrane emulsion within said crack. When cured, the cured asphalt membrane emulsion within the crack comprises asphalt, an asphalt modifier, mineral filler, and an emulsifier.

The asphalt membrane emulsion may, when applied to a surface or into a crack, when cured, exhibit a pen rating between 20 and 80, such as, between 40 and 70. The asphalt membrane emulsion may, when applied to a surface or into a crack, when cured, exhibit an Original Dynamic Shear Rheometer test (ODSR) value, per AASHTO M320, of at least 82.5 kiloPascals (kPa), such as, between 88.7 and 92.3 kPa.

The following numbered clauses are illustrative of various aspects of the invention:

Clause 1: An asphalt membrane emulsion for reducing voids in an asphalt joint comprising asphalt, an asphalt modifier, mineral filler, an emulsifier, and water.

Clause 2: The asphalt membrane emulsion of clause 1, wherein the asphalt comprises performance grade (PG) 64-22, PG 58-28, PG 58-22, PG 52-28, PG 52-22, PG 52-34, PG 58-34, or combinations thereof.

Clause 3: The asphalt membrane emulsion of clause 1, wherein the asphalt comprises performance grade (PG) 52-28, PG 58-28, PG 64-22, or combinations thereof.

Clause 4: The asphalt membrane emulsion of clause 1, wherein the asphalt comprises performance grade (PG) 58-28, PG 52-28, or combinations thereof.

Clause 5: The asphalt membrane emulsion of any of clauses 1 to 4, wherein the asphalt modifier comprises isocyanate, styrene butadiene, styrene butadiene styrene, styrene butadiene rubber, polystyrene, polychloroprene, dispersions thereof, or combinations thereof.

Clause 6: The asphalt membrane emulsion of clause 5, wherein the asphalt modifier comprises styrene butadiene styrene.

Clause 7: The asphalt membrane emulsion of any of the preceding clauses, wherein the mineral filler comprises rock dust, mineral dust, sand, slag dust, lime, fly ash, Portland cement, loess, combinations thereof, or mixtures thereof.

Clause 8: The asphalt membrane emulsion of any of the preceding clauses, wherein the mineral filler comprises lime.

Clause 9: The asphalt membrane emulsion of clause 8, wherein the lime comprises calcium based lime, magnesium based lime, or combinations thereof.

Clause 10: The asphalt membrane emulsion of any of clauses 8 to 9, wherein the lime comprises agricultural lime, ASTM grade lime, or combinations thereof.

Clause 11: The asphalt membrane emulsion of any of claim 10, wherein the ASTM lime comprises N type, NA type, S type, SA type lime, or combinations thereof.

Clause 12: The asphalt membrane emulsion of any of the preceding clauses, wherein the asphalt membrane emulsion is a cationic asphalt membrane emulsion.

Clause 13: The asphalt membrane emulsion of clause 12, wherein the cationic asphalt membrane emulsion comprises a cationic emulsifier.

Clause 14: The asphalt membrane emulsion of clause 13, wherein the cationic emulsifier is selected from the group consisting of Redicote E-11E, Redicote E-11HF, and Indulin AA-57D.

Clause 15: The asphalt membrane emulsion of clause 14, wherein the cationic emulsifier is Redicote E-11HF.

Clause 16: The asphalt membrane emulsion of clause 12, wherein the asphalt membrane emulsion does not comprise an acid.

Clause 17: The asphalt membrane emulsion of clause 1, wherein the asphalt membrane emulsion is an anionic asphalt membrane emulsion.

Clause 18: The asphalt membrane emulsion of clause 17, wherein the anionic asphalt membrane emulsion comprises an anionic emulsifier.

Clause 19: The asphalt membrane emulsion of clause 17, wherein the asphalt membrane emulsion comprises a base.

Clause 20: The asphalt membrane emulsion of clause 19, wherein the base comprises sodium hydroxide, potassium hydroxide, or combinations thereof.

Clause 21: The asphalt membrane emulsion of clause 13, wherein the cationic emulsifier is a quaternary ammonium salt based emulsifier.

Clause 22: The asphalt membrane emulsion of any of the preceding clauses, further comprises a thickener.

Clause 23: The asphalt membrane emulsion of clause 22, wherein the thickener comprises a water-soluble cellulose backbone and ether containing substituents.

Clause 24: The asphalt membrane emulsion of clause 23, wherein the thickener comprises methyl cellulose, sodium carboxymethyl cellulose, hydroxypropyl cellulose, ethyl hydroxyethyl cellulose, hydroxyethyl cellulose, methyl hydroxypropyl cellulose, methyl ethyl hydroxyethyl cellulose, or combinations thereof.

Clause 25: The asphalt membrane emulsion of clause 24, wherein the thickener is methyl hydroxypropyl cellulose.

Clause 26: The asphalt membrane emulsion of any of the preceding clauses, further comprising a sulfur cross-linker.

Clause 27: A method of making an asphalt membrane emulsion, the method comprising: forming a first phase comprising: asphalt; asphalt modifier; and mineral filler; forming a second phase comprising: water; and an emulsifier; pumping the first phase and the second phase into a colloid mill; and mixing the first phase and second phase in the colloid mill to form the asphalt membrane emulsion.

Clause 28: The method of clause 27, wherein forming the first phase comprises: heating the asphalt to a temperature of at least about 300 degrees Fahrenheit; adding the asphalt modifier to the asphalt using in-line mixing, tank mixing, in-line milling, or combinations thereof to form a modified asphalt; and adding the mineral filler to the modified asphalt using in-line mixing, tank mixing, in-line milling, or combinations thereof.

Clause 29: The method of clause 27, wherein the first phase comprises, by weight, between about 50% and 96% asphalt, between about 1% and 15% asphalt modifier, and between about 0.5% and 12% mineral filler.

Clause 30: The method of clause 27, wherein the first phase further comprises a sulfur cross-linker comprising, by weight, between about 0.01% and about 3%.

Clause 31: The method of any of clauses 27 to 30, wherein the sulfur cross-linker is added to the modified asphalt prior to adding the mineral filler.

Clause 32: The method of any of clauses 27 to 29, wherein the asphalt comprises performance grade (PG) 64-22, PG 58-28, PG 58-22, PG 52-28, PG 52-22, PG 52-34, PG 58-34, or combinations thereof.

Clause 33: The method of any of clauses 27 to 29, wherein the asphalt comprises performance grade (PG) 52-28, PG 58-28, PG 64-22, or combinations thereof.

Clause 34: The method of any of clauses 27 to 29, wherein the asphalt comprises performance grade (PG) 58-28, PG 52-28, or combinations thereof.

Clause 35: The method of any of clauses 27 to 29, wherein the asphalt modifier comprises isocyanate, styrene butadiene, styrene butadiene styrene, styrene butadiene rubber, polystyrene, polychloroprene, dispersions thereof, or combinations thereof.

Clause 36: The method of clause 35, wherein the asphalt modifier comprises styrene butadiene styrene.

Clause 37: The method of clauses 27 to 29, wherein the mineral filler comprises rock dust, mineral dust, sand, slag dust, lime, fly ash, Portland cement, loess, combinations thereof, or mixtures thereof.

Clause 38: The method of clause 37, wherein the mineral filler comprises lime.

Clause 39: The asphalt membrane emulsion of clause 38, wherein the lime comprises calcium based lime, magnesium based lime, or combinations thereof.

Clause 40: The asphalt membrane emulsion of any of clauses 38 to 39, wherein the lime comprises agricultural lime, ASTM grade lime, or combinations thereof.

Clause 41: The asphalt membrane emulsion of any of clause 40, wherein the ASTM lime comprises N type, NA type, S type, SA type lime, or combinations thereof.

Clause 42: The method of clause 27, wherein forming the second phase comprises: heating the water to a temperature of at least 120 degrees Fahrenheit; and mixing in the emulsifier.

Clause 43: The method of clause 27, wherein the second phase comprises, by weight, between about 80% and 99% water, and between about 0.5% and 12% emulsifier.

Clause 44: The method of clause 43, wherein the second phase further comprises a thickener comprising, by weight, between 0.05% and 5%.

Clause 45: The method of clause 27, wherein asphalt membrane emulsion is a cationic asphalt membrane emulsion.

Clause 46: The method of clause 45, wherein the cationic asphalt membrane emulsion comprises a cationic emulsifier in the second phase.

Clause 47: The method of clause 46, wherein the cationic emulsifier is selected from the group consisting of Redicote E-11E, Redicote E-11HF, and Indulin AA-57D.

Clause 48: The method of clause 47, wherein the cationic emulsifier is Redicote E-11HF.

Clause 49: The method of clause 46, wherein the cationic emulsifier is a quaternary ammonium salt based emulsifier.

Clause 50: The method of clause 46, wherein the second phase does not comprise an acid.

Clause 51: The method of clauses 43 to 49, wherein the second phase further comprises between 0.5 weight percent to 3 weight percent of an acid to obtain a pH between about 1 and about 3.

Clause 52: The method of clause 51, wherein the acid is added after the emulsifier.

Clause 53: The method of clause 27, wherein the asphalt membrane emulsion is an anionic asphalt membrane emulsion.

Clause 54: The method of clause 53, wherein the anionic asphalt membrane emulsion comprises an anionic emulsifier in the second phase.

Clause 55: The method of clauses 53 to 54, wherein the second phase further comprises, by weight, between 0.1% to 0.3% of a base to obtain a pH between about 9 and about 12.

Clause 56: The method of clause 27, wherein the first phase comprises, by weight, between about 40% and about 85%, and the second phase comprises, by weight, between about 15% and about 60%.

Clause 57: The method of clause 27, wherein the first phase is heated to a temperature of at least 360 degrees Fahrenheit and pumped into the colloid mill.

Clause 58: The method of clause 27, wherein the second phase is heated to a temperature of at least 100 degrees Fahrenheit and pumped in the colloid mill.

Clause 59: The method of clause 27, wherein the asphalt membrane emulsion does not exceed a temperature of greater than 212 degrees Fahrenheit.

Clause 60: A method of filling a crack comprising: providing the asphalt membrane emulsion, wherein the asphalt membrane emulsion comprises an asphalt, an asphalt modifier, a mineral filler, an emulsifier and water; applying the asphalt membrane emulsion into a crack; and curing the asphalt membrane emulsion within the crack.

Clause 61: The method of clause 60, wherein the asphalt comprises performance grade (PG) 64-22, PG 58-28, PG 58-22, PG 52-28, PG 52-22, PG 52-34, PG 58-34, or combinations thereof.

Clause 62: The asphalt membrane emulsion of clause 60, wherein the asphalt comprises (PG) 52-28, PG 58-28, PG 64-22, or combinations thereof.

Clause 63: The asphalt membrane emulsion of clause 60, wherein the asphalt comprises performance grade (PG) 58-28, PG 52-28, or combinations thereof.

Clause 64: The method of clause 60, wherein the asphalt modifier comprises isocyanate, styrene butadiene, styrene butadiene styrene, styrene butadiene rubber, polystyrene, polychloroprene, dispersions thereof, or combinations thereof.

Clause 65: The method of clause 64, wherein the asphalt modifier comprises styrene butadiene styrene.

Clause 66: The method of clause 60, wherein the mineral filler comprises rock dust, mineral dust, sand, slag dust, lime, fly ash, Portland cement, loess, combinations thereof, or mixtures thereof.

Clause 67: The method of clause 66, wherein the mineral filler comprises lime.

Clause 68: The asphalt membrane emulsion of clause 67, wherein the lime comprises calcium based lime, magnesium based lime, or combinations thereof.

Clause 69: The asphalt membrane emulsion of any of clauses 67 to 68, wherein the lime comprises agricultural lime, ASTM grade lime, or combinations thereof.

Clause 70: The asphalt membrane emulsion of any of clause 69, wherein the ASTM lime comprises N type, NA type, S type, SA type lime, or combinations thereof.

Clause 71: The method of any of clauses 60 to 70, wherein the asphalt membrane emulsion further comprises a sulfur cross-linker.

Clause 72: The method of clause 60, wherein the asphalt membrane emulsion is a cationic asphalt membrane emulsion.

Clause 73: The method of clause 72, wherein the emulsifier is a cationic emulsifier.

Clause 74: The method of clause 73, wherein the cationic emulsifier is selected from the group consisting of Redicote E-11E, Redicote E-11HF, and Indulin AA-57D.

Clause 75: The method of clause 74, wherein the cationic emulsifier is Redicote E-11HF.

Clause 76: The method of clause 73, wherein the cationic emulsifier is a quaternary ammonium salt based emulsifier.

Clause 77: The method of clause 72, wherein the asphalt membrane emulsion does not comprise an acid.

Clause 78: The method of clause 60, wherein the asphalt membrane emulsion is an anionic asphalt membrane emulsion.

Clause 79: The method of clause 78, wherein the emulsifier is an anionic emulsifier.

Clause 80: The method of clause 79, wherein the asphalt membrane emulsion further comprises a base.

Clause 81: The method of clause 60, wherein the asphalt membrane emulsion further comprises a thickener.

Clause 82: The method of clause 60, wherein the asphalt membrane emulsion is applied by a standard spray distributor, tack buggy, hand sprayer, or combinations thereof.

Clause 83: The method of clause 60, wherein the asphalt membrane emulsion is cured by heating.

Clause 84: An asphalt surface comprising a crack and a cured asphalt membrane emulsion within said crack, wherein the cured asphalt membrane emulsion within the crack comprises asphalt, an asphalt modifier, mineral filler, and an emulsifier.

Clause 85: The asphalt surface of clause 84, wherein the cured asphalt membrane emulsion exhibits a pen rating between 20 and 80.

Clause 86: The asphalt surface of clause 84, wherein the cured asphalt membrane emulsion exhibits an ODSR value of at least 82.5 kiloPascals.

Clause 87: The asphalt surface of clause 84, wherein the asphalt comprises performance grade (PG) 64-22, PG 58-28, PG 58-22, PG 52-28, PG 52-22, PG 52-34, PG 58-34, or combinations thereof.

Clause 88: The asphalt surface of clause 84, wherein the asphalt comprises (PG) 52-28, PG 58-28, PG 64-22, or combinations thereof.

Clause 89: The asphalt membrane emulsion of clause 84, wherein the asphalt comprises performance grade (PG) 58-28, PG 52-28, or combinations thereof.

Clause 90: The method of clause 84, wherein the asphalt modifier comprises isocyanate, styrene butadiene, styrene butadiene styrene, styrene butadiene rubber, polystyrene, polychloroprene, dispersions thereof, or combinations thereof.

Clause 91: The method of clause 90, wherein the asphalt modifier comprises styrene butadiene styrene.

Clause 92: The method of clause 84, wherein the mineral filler comprises rock dust, mineral dust, sand, slag dust, lime, fly ash, Portland cement, loess, combinations thereof, or mixtures thereof.

Clause 93: The method of clause 92, wherein the mineral filler comprises lime.

Clause 94: The asphalt membrane emulsion of clause 93, wherein the lime comprises calcium based lime, magnesium based lime, or combinations thereof.

Clause 95: The asphalt membrane emulsion of any of clauses 93 to 94, wherein the lime comprises agricultural lime, ASTM grade lime, or combinations thereof.

Clause 96: The asphalt membrane emulsion of any of clause 95, wherein the ASTM lime comprises N type, NA type, S type, SA type lime, or combinations thereof.

Clause 97: The method of any of clauses 84 to 96, wherein the asphalt membrane emulsion further comprises a sulfur cross-linker.

Clause 98: The method of clause 84, wherein the asphalt membrane emulsion is a cationic asphalt membrane emulsion.

Clause 99: The method of clause 84, wherein the emulsifier is a cationic emulsifier.

Clause 100: The method of clause 99, wherein the cationic emulsifier is selected from the group consisting of Redicote E-11E, Redicote E-11HF, and Indulin AA-57D.

Clause 101: The method of clause 100, wherein the cationic emulsifier is Redicote E-11HF.

Clause 102: The method of clause 99, wherein the cationic emulsifier is a quaternary ammonium salt based emulsifier.

Clause 103: The method of any of clauses 98 to 102, wherein the asphalt membrane emulsion does not comprise an acid.

Clause 104: The method of clause 84, wherein the asphalt membrane emulsion is an anionic asphalt membrane emulsion.

Clause 105: The method of clause 84, wherein the emulsifier is an anionic emulsifier.

Clause 106: The method of any of clauses 104 to 105, wherein the asphalt membrane emulsion further comprises a base.

Clause 107: The method of any of clauses 84 to 106, wherein the asphalt membrane emulsion further comprises a thickener.

The following examples are presented to exhibit the general principles of the invention. The invention should not be considered as limited to the specific examples presented.

EXAMPLES

Example 1

The raw materials in Table 1 below were combined according to the process described in Table 1 to form Asphalt First Phase A.

TABLE 1

| Raw Material | Recommended wt. % | Range of wt. % | Process |
|---|---|---|---|
| Asphalt | 87.87 | 85-89 | Heat to 300-350° F. for modification Heat to 380° F. for emulsification |
| Styrene Butadiene Styrene (SBS) | 6.75 | 6-8 | Add to heated asphalt using in-line mixing, tank mixing, and/or in-line milling to form SBS modified asphalt |
| Sulfur Cross-Linker | 0.38 | 0.25-0.5 | Add to SBS modified asphalt using in-line mixing, tank mixing, and/or in-line milling to form SBS and sulfur modified asphalt |
| Mineral Filler | 5 | 3-7 | Add to SBS and sulfur modified asphalt using in-line mixing, tank mixing, and/or in-line milling |

Example 2

The raw materials in Table 2 below were combined according to the process described in Table 1 to form Cationic Second Phase A.

TABLE 2

| Raw Material | Recommended wt. % | Range of wt. % | Process |
|---|---|---|---|
| Water | 94.5 | 92-97 | Ambient temperature and municipally sourced having a pH of 6-8 |
| Thickener | 0.5 | 0-1% | Heat the mix water and thickener up to 120° F., while mixing, until the thickener is fully dissolved in the water (Optional) |
| Emulsifier | 5 | 3.5-6 | Any emulsifier recommended for highly viscous asphaltic products, such as, the Quaternary Ammonium Salt emulsifier, is added to the previous mix while the temperature is maintained at 120° F. The speed of the mixer and mixing time is adjusted in such a manner that the emulsifier has a chemical interaction with the thickener until the rheological modification occurs as confirmed by continuous wave contour without fixed points. |
| | | | For low viscosity asphaltic products without a thickener, the mix water and emulsifier is heated up to 120° F., while mixing |
| Acid | 0 | 0-0.5 | Add acid, when used, to water mixture to obtain a pH between 1 and 3 |

Example 3

The Asphalt First Phase A and the Cationic Second Phase A, from Examples 1 and 2 respectively, were combined in the amounts and according to the process described in Table 3 to form Asphalt Membrane Emulsion A.

TABLE 3

| Raw Material | Recommended wt. % | Range of wt. % | Process |
|---|---|---|---|
| Cationic Second Phase A | 35 | 30-40 | Run Cationic Second Phase A through the colloid mill at 100-120° F. |
| Asphalt First Phase A | 65 | 60-70 | Add Asphalt First Phase A to colloidal mill at 360-380° F.; Ensure that mixture in colloidal mill output does not exceed 212° F. so that the water is not boiled off (ideal output temperature is 205° F.) |

Physical properties associated with Asphalt Membrane Emulsion A are as shown in Table 4. The unit for Paddle Cannon viscosity is milliPascal-second (mPa·s). Equivalent ASTM methods, AASHTO methods, or other standard tests may be used.

TABLE 4

| Test | Procedure | Recommended Values |
|---|---|---|
| Saybolt viscosity (seconds) (Optional) | AASHTO T 59 | 100-400 seconds |
| Paddle Cannon viscosity (mPa · s) | AASHTO T382 | Minimum 500 mPa · s at 50° C. |
| Sieve (%) | AASHTO T 59 | Maximum 0.10% |
| Storage Stability 24 hours (%) | AASHTO T 59 | Maximum 1% over 24 hours |
| % Residue by Evaporation (%) | ASTM D 7404 | Minimum 65% |

Physical properties associated with the residue of Asphalt Membrane Emulsion A are as shown in Table 5, where DSR means Dynamic Shear Rheometer and MSCR means Multiple Stress Creep Recovery. The unit for rotational viscosity is centipoise (cP). Equivalent ASTM methods, AASHTO methods, or other standard tests may be used.

TABLE 5

| Test | Procedure | Recommended Values |
|---|---|---|
| Pen on evaporation residue | AASTHO T 49 | 20-80 |
| DSR tests | AASHTO M320 | 88 minutes Original DSR (ODSR) 90 minutes TruGrade Temp. |
| DSR MSCR Test | AASHTO M350 | E Grade MSCR on unaged residue |
| Rotational Viscosity | ASTM D4402/ D4402M | Max 3000 cP at 135° C. Max 600 cP at 165° C. Max 350 cP at 176.6° C. |

The invention claimed is:

1. An asphalt membrane emulsion for reducing voids in an asphalt joint comprising:
   a first phase comprising asphalt, an asphalt modifier, and mineral filler comprising finely-divided mineral matter, wherein the mineral filler comprises a particle size of less than 300 microns (μm); and
   a second phase comprising an emulsifier and water,
   wherein the first phase and the second phase are mixed in a colloid mill to form the asphalt membrane emulsion.

2. The asphalt membrane emulsion of claim 1, wherein the asphalt comprises performance grade (PG) 64-22, PG 58-28, PG 58-22, PG 52-28, PG 52-22, PG 52-34, PG 58-34, or combinations thereof.

3. The asphalt membrane emulsion of claim 1, wherein the asphalt modifier further comprises isocyanate, styrene butadiene, styrene butadiene styrene, styrene butadiene rubber, polystyrene, polychloroprene, dispersions thereof, or combinations thereof.

4. The asphalt membrane emulsion of claim 3, wherein the asphalt modifier comprises styrene butadiene styrene.

5. The asphalt membrane emulsion of claim 1, wherein the mineral filler comprises lime.

6. The asphalt membrane emulsion of claim 1, wherein the asphalt membrane emulsion is a cationic asphalt membrane emulsion.

7. The asphalt membrane emulsion of claim 6, wherein the asphalt membrane emulsion does not comprise an acid.

8. The asphalt membrane emulsion of claim 6, wherein the cationic asphalt membrane emulsion comprises a cationic emulsifier.

9. The asphalt membrane emulsion of claim 8, wherein the cationic emulsifier is a quaternary ammonium salt based emulsifier.

10. The asphalt membrane emulsion of claim 1, wherein the asphalt membrane emulsion is an anionic asphalt membrane emulsion.

11. The asphalt membrane emulsion of claim 10, wherein the anionic asphalt membrane emulsion comprises an anionic emulsifier.

12. The asphalt membrane emulsion of claim 10, wherein the asphalt membrane emulsion comprises a base,
   wherein the base comprises sodium hydroxide, potassium hydroxide, or combinations thereof.

13. The asphalt membrane emulsion of claim 1, wherein the second phase further comprises a thickener.

14. The asphalt membrane emulsion of claim 13, wherein the thickener comprises a water-soluble cellulose backbone and ether containing substituents.

15. The asphalt membrane emulsion of claim 14, wherein the thickener comprises methyl cellulose, sodium carboxymethyl cellulose, hydroxypropyl cellulose, ethyl hydroxyethyl cellulose, hydroxyethyl cellulose, methyl hydroxypropyl cellulose, methyl ethyl hydroxyethyl cellulose, or combinations thereof.

16. The asphalt membrane emulsion of claim 15, wherein the thickener is methyl hydroxypropyl cellulose.

17. The asphalt membrane emulsion of claim 1, further comprising an acid,
   wherein the acid comprises hydrochloric acid, sulfuric acid, acetic acid, or combinations thereof.

18. The asphalt membrane emulsion of claim 1, wherein the first phase further comprises a sulfur cross-linker.

* * * * *